May 6, 1958

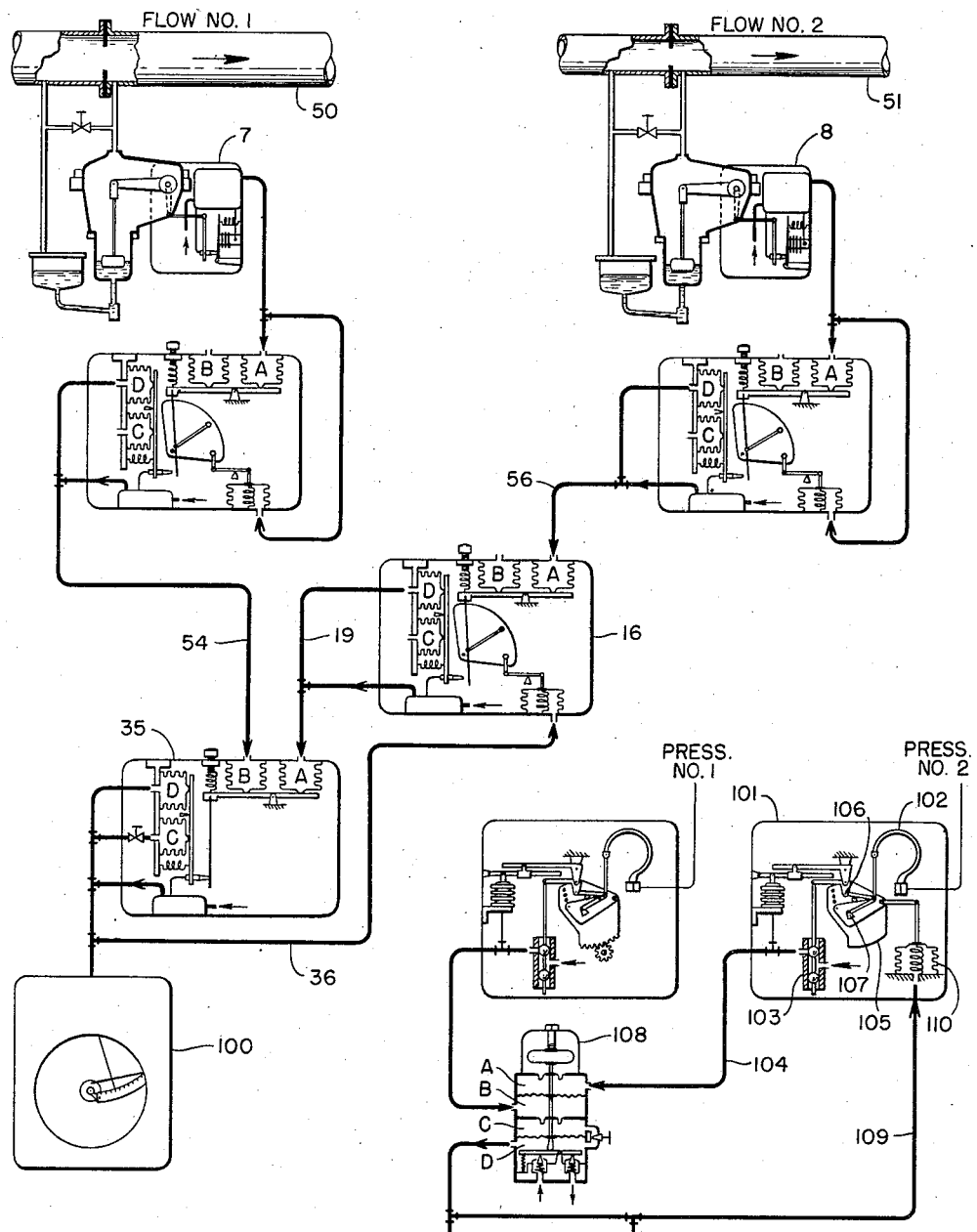

J. F. SHANNON 2,833,298

RATIO CONTROL SYSTEMS

Filed Nov. 12, 1954

INVENTOR.
JACK F. SHANNON
BY
Raymond W Junkins
ATTORNEY

United States Patent Office 2,833,298
Patented May 6, 1958

2,833,298
RATIO CONTROL SYSTEMS

Jack F. Shannon, Euclid, Ohio, assignor to Bailey Meter Company, a corporation of Delaware Application November 12, 1954, Serial No. 468,244

9 Claims. (Cl. 137—85)

My invention relates to systems and apparatus for indicating, recording, or otherwise exhibiting and/or controlling the value of a position, measurement or variable. More particularly, the invention relates to such systems wherein a fluid pressure is established representative of that which is to be measured or controlled, and then the fluid pressure is used to actuate an exhibiting or controlling device. While not necessarily so limited, the invention is particularly adapted and useful in fluid pressure telemetering systems employing air under pressure as the active motive fluid and is so disclosed herein by way of example only.

In many instances the physical location of the measuring point may be far removed from the location of a control valve; and both, a considerable distance from availability to the operator who should be able to observe the value of the variable, the effect of the regulation, as well as to have available the possibility of removing the system from "automatic" and placing it under "manual" control.

Fluid pressure telemetering is known wherein a fluid pressure is developed continuously bearing a relation to the value of the variable or to the extent and direction of departure of the value from desired standard or set-point. Such a measuring-controller is a transmitter which may be indicating and recording and may preferably be located adjacent the desirable point of measurement of the variable, for many reasons. The fluid loading pressure is transmitted to a control valve for positioning the same, and the transmitter and valve may be widely separated. Intermediate the two is a manual-automatic selector station which may be conveniently located upon a control panel, with other measuring and controlling instrumentalities at a central location, under observation of an operator. It is frequently necessary, in such a system, to have one or more fluid pressure relays and these are preferably functionally located intermediate the transmitter and the selector station so that the relay effects may be available upon the regulating valve through the selector station but, under "manual" control, the relay is not effective upon the regulating valve as would be the case were it functionally located between the selector station and the regulating valve.

The fluid pressure relay, or relays, receiving the fluid loading pressure which is representative of the variable, establish an output control pressure which may be of the same, or of a different magnitude, for actuation of the receiver mechanism. Frequently such relays are employed to give the algebraic summation of two or more individual loading pressures, to double or halve the loading pressure value, to ratio it, or to otherwise modify the loading pressure representative of one or more variables into a resultant outgoing control pressure bearing a determined value relationship to the measurement variable or variables. The relays are usually physically located intermediate the point of measurement and the point of exhibiting or controlling. Usually they are of the force- balance, position-balance, or force-position-balance type and employ expansible-contractible pressure receiving chambers having a movable wall for varying a force or position system. Common types include bellows or diaphragms of various materials.

A basic relay type, disclosed and claimed in the copending application of Harvard H. Gorrie, S. N. 311,098 filed September 23, 1952, now Patent 2,776,669, owned by the present assignee, is provided with proportional band or sensitivity adjustments which are arranged for manual manipulation. My parent application S. N. 318,992, filed November 6, 1952, now Patent 2,743,710, of which this application is a continuation-in-part, provided improvements thereover, including means for remotely manually varying the sensitivity or proportional band setting of the relay, varying the sensitivity in accordance with the variable, or automatically changing the sensitivity of the relay responsive to one or more variables which are preferably applied by fluid pressure means.

An object of the present invention is to provide a system, including the improved relay of my parent application, by which the ratio of the magnitudes of two conditions may be manifested. This objective is carried out by establishing a force impulse representative of each magnitude and comparing these impulses in a relay. The output of the comparing relay is representative of the ratio of the magnitudes of the impulses because of its proportional actuation of linkage multiplying one of the compared impulses in an improved characterizing relay.

Another object is to provide a system, including an improved relay, with which to establish a plurality of impulses for the control of a plurality of agents exerting their influences separately, and concomitantly, on a plurality of conditions.

Other objects will appear in the course of the following description.

In the drawings:

Fig. 1 diagrammatically illustrates the embodiment of my improved relay in a fluid flow ratio control system.

Fig. 5 illustrates the system of Fig. 4 wherein the outputs of head meters are made linear representations.

Fig. 6 illustrates the system of Fig. 4 with the conditions represented as pressures and utilizing relays of somewhat different form.

Figures 1, 2:
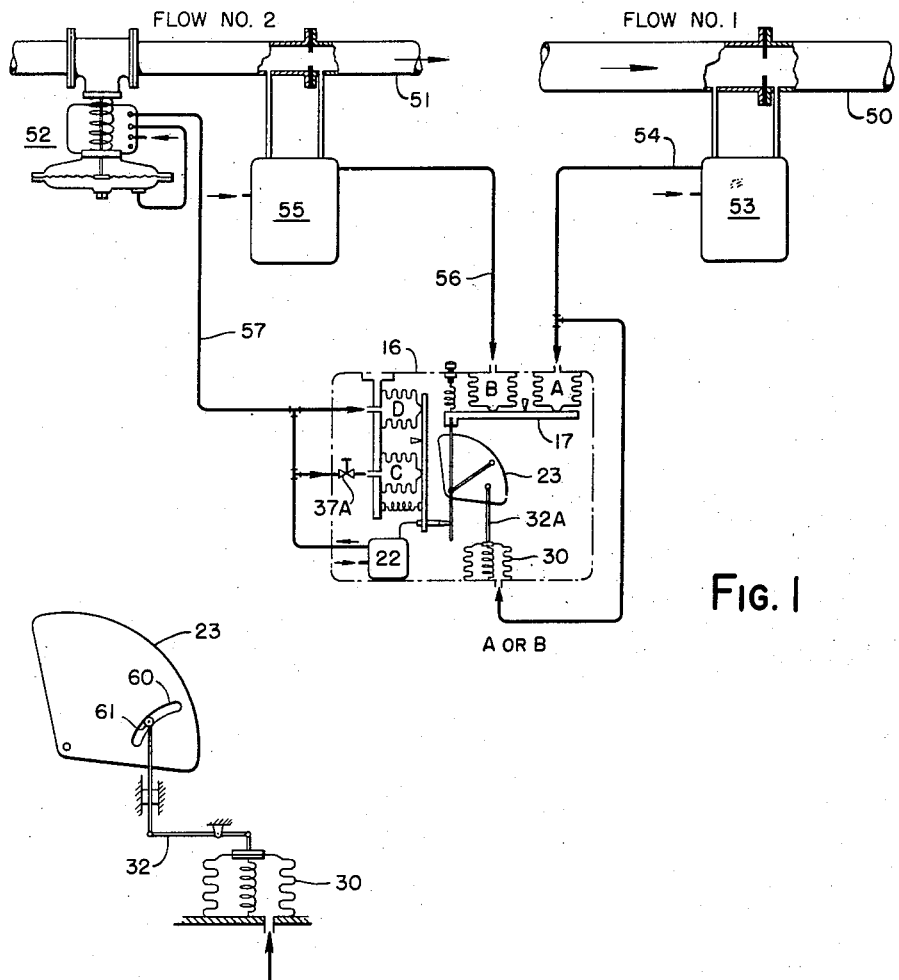
Fig. 2 shows a modification of a portion of my improved relay incorporating characterizing means.

In Fig. 1 I diagrammatically illustrate the incorporation of my improved relay of my parent application in a flow ratio control utilizing either flow rate meters or head meters.

Consider first the case with flow rate meters where equal increments of flow rate result in equal increments of fluid loading pressure. "Flow No. 1," of a fluid flowing through a conduit 50, is considered the dictator. "Flow No. 2," of a second fluid flowing through a conduit 51, is the slave. A control valve 52, in conduit 51, is regulated to maintain "Flow No. 2" in desired ratio to "Flow No. 1."

A meter 53 is adapted to establish a pneumatic loading pressure in pipe 54 continuously representative of fluid rate of flow through conduit 50 and the relation is linear. Similarly, the meter 55 establishes a pneumatic loading pressure in pipe 56 in linear relation to flow rate through conduit 51. Pipe 54 joins the A chamber, and pipe 56 joins the B chamber, of relay 16. In Fig. 1 I show the pipe 54 also joining the bellows 30 although, under certain conditions, I may wish to join pipe 56 to the bellows 30.

The booster 22 provides an output pneumatic control pressure for a pipe 57 leading to the control valve 52, loads the balancing relay D chamber and, through an adjustable restriction 37A, loads the relay C chamber. A standardizing reset action is provided, as explained in connection with the relay 35 of my parent application.

The relay 16 is provided with a proportional band or sensitivity adjusting sector 23. Adjustment of this sector will change the sensitivity of the control pressure output of 22 with an unbalance of beam 17.

It is possible to introduce a constant difference between Flow No. 1 and Flow No. 2 by the spring adjustment on beam 17. However, this would result in a variable ratio as the flow rate changes. The assumption is, of course, that there is sufficient capacity design of the conduits, orifices, and meters to allow maintenance of the desired difference or ratio.

In some instances, due to the system response of the control circuit, it may be required to vary the sensitivity either directly or inversely with flow rate while maintaining a constant ratio. The arrangement of Fig. 1 allows the automatic setting of the sensitivity of the system by the adjustment of sector 23 from variations in the dictating or master flow rate in conduit 50. A predetermined ratio is maintained in the following manner. An increase in the pressure of chamber A of relay 16, resulting from an increase in flow rate in conduit 50, will unbalance the beam 17. This unbalance operates the fluid pressure couple to effect an increase in output of 22 and an opening of control valve 52 creating an increase in the signal from meter 55, which, connected to the B chamber, will balance the initial increase in the A chamber pressure. The sequence is identical in the opposite direction of change in flow rate.

Assume that I desire to maintain a constant ratio of 2:1, with Flow No. 1 always twice Flow No. 2 regardless of variations in Flow No. 1. This may be accomplished by sizing the orifices producing the operative differentials for meters 53 and 55 such that the flow rate in pipe 50 is twice the flow rate in pipe 51 for the same percent range of each meter. The output of 22 will then maintain a position of the control valve 52 such that beam 17 will remain in balance, thereby maintaining a constant ratio. For a 2:1 ratio:

| Percent Range Both Meters | Flow No. 1, Lbs./Hr. | Flow No. 2, Lbs./Hr. |
| --- | --- | --- |
| 25 | 50 | 25 |
| 50 | 100 | 50 |
| 75 | 150 | 75 |
| 100 | 200 | 100 |

This indicates that an error, reduced to pounds per hour, is more critical at low rates of flow than the same error at higher rates of flow, in view of the requirement to maintain a constant ratio within desired limits. Therefore, the sensitivity should be the greatest at low rates of flow, and decrease with an increase in flow rate. This may be desirable to avoid hunting or cycling of the control system. The bellows 30 is connected by a direct linkage 32A to sector 23, and the pneumatic loading pressure of pipe 54, representative of Flow No. 1, is impressed upon bellows 30. By adjustment of this linkage, the relay may be set to give any desired range of sensitivity change.

It may be desirable, under certain conditions, to require an increase in sensitivity with an increase in flow rate. This may be accomplished by a reverse acting linkage between bellows 30 and sector 23.

The second case to consider, for the system of Figure 1, is where meters 53 and 55 are head meters, producing in pipes 54 and 56 respectively, pneumatic loading pressures bearing a non-linear relation to flow rate. In this application, even more so than with linear flow rate meters, it is desirable to have a greatly increased sensitivity at low flow rates since a small change in flow at a low rate creates a change in head much less than a similar change in flow at a higher rate.

In this second case, however, the unbalance in beam 17 loading, as Flow No. 1 increases, is not only one caused by flow differences to maintain a constant ratio, but additionally introduces the difference in loading pressure increments (representative of head) as discussed in my parent application. The positioning of sector 23 becomes one of satisfying both differences and this may lead beyond the exact arrangement of Fig. 1. In Fig. 2 I show that the sector 23 may be provided with a shaped slot 60 guiding a roller 61 which may be carried on the end of linkage 32 (or 32A). Thus, the bellows 30 positions sector 23 through the means 60, 61 providing a further characterizing possibility.

Figure 3:
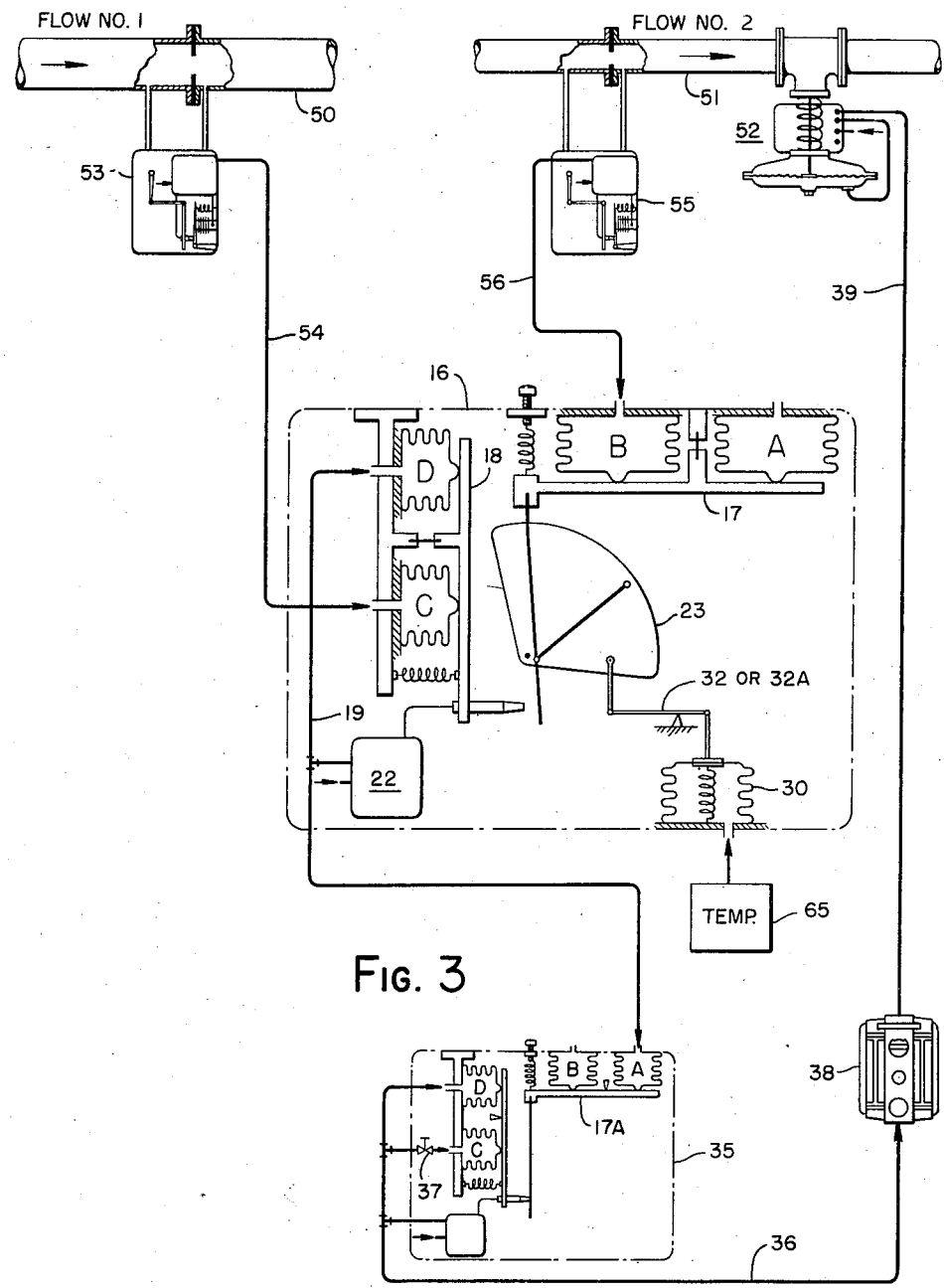
Fig. 3 illustrates a fluid flow ratio control system wherein the ratio is established by a variable condition or value.

In Fig. 3, there is illustrated a flow control system which automatically ratios one fluid flow to another and allows the resetting of the ratio in accordance with a third variable. The problem specifically illustrated and described is representative, or by way of example only.

In a chemical treatment process two fluids are desirably to be maintained at a predetermined ratio at one temperature, but with the ratio desirably different at other temperatures. The temperature may be of one or the other of the component flows, of the mixture, or any desired temperature. In fact, the ratio adjusting variable need not be temperature but may be pressure, pH, viscosity or some other variable.

The meters 53 and 55 are flow rate meters for the fluids flowing in conduits 50 and 51 respectively. Thus the pneumatic loading pressures established in the pipes 54 and 56 bear linear relation to the respective flows. The dictator Flow No. 1 has its loading pressure applied to the C chamber of relay 16 while the slave or follower Flow No. 2 has its representative fluid loading pressure applied to the B chamber. The A chamber is an idle chamber open to the atmosphere. The output of booster relay 22, available in output pipe 19, is applied to the balancing D chamber for the force-beam 18. The pressure in pipe 19 is further applied to the A chamber of standardizing relay 35 whose output, in pipe 36, acts through the selector station 38 and pipe 39 to position the control valve 52 for Flow No. 2. Under certain conditions the pipes 54 and 56 may desirably be interchanged as to chambers C and B, or as to C and A.

Relay 16 is a ratio relay with its proportional band setting determining the ratio between force-beam 17 and force-beam 18. Were the sector 23 to remain in a preselected position then a uniform ratio would be had between Flow No. 1 and Flow No. 2. The dictator flow, applied to the C chamber, upsets the balance of force-beam 18, resulting in a change in D chamber pressure which tends to balance the force-beam 18 against the new C chamber pressure while, substantially simultaneously, the change in flow through the conduit 51 is in proper direction to affect the force-beam 17 and the nozzle-baffle relationship. With the proportional band adjustment intermediate the beams 17, 18, any change in flow rate in conduit 50 will result in a new flow rate within conduit 51 in desired ratio to the dictator rate when the relay system has balanced out.

Device 65 represents a controller establishing a fluid loading pressure for bellows 30 continuously representative of a temperature. Inasmuch as the bellows 30, acting through linkage 32 or 32A, positions the proportional band sector 23, it will be apparent that the ratio between the two flows of conduits 50 and 51 may be varied in accordance with a temperature condition or any similar variable which may be applied as through 65 to the bellows 30.

Figure 4:
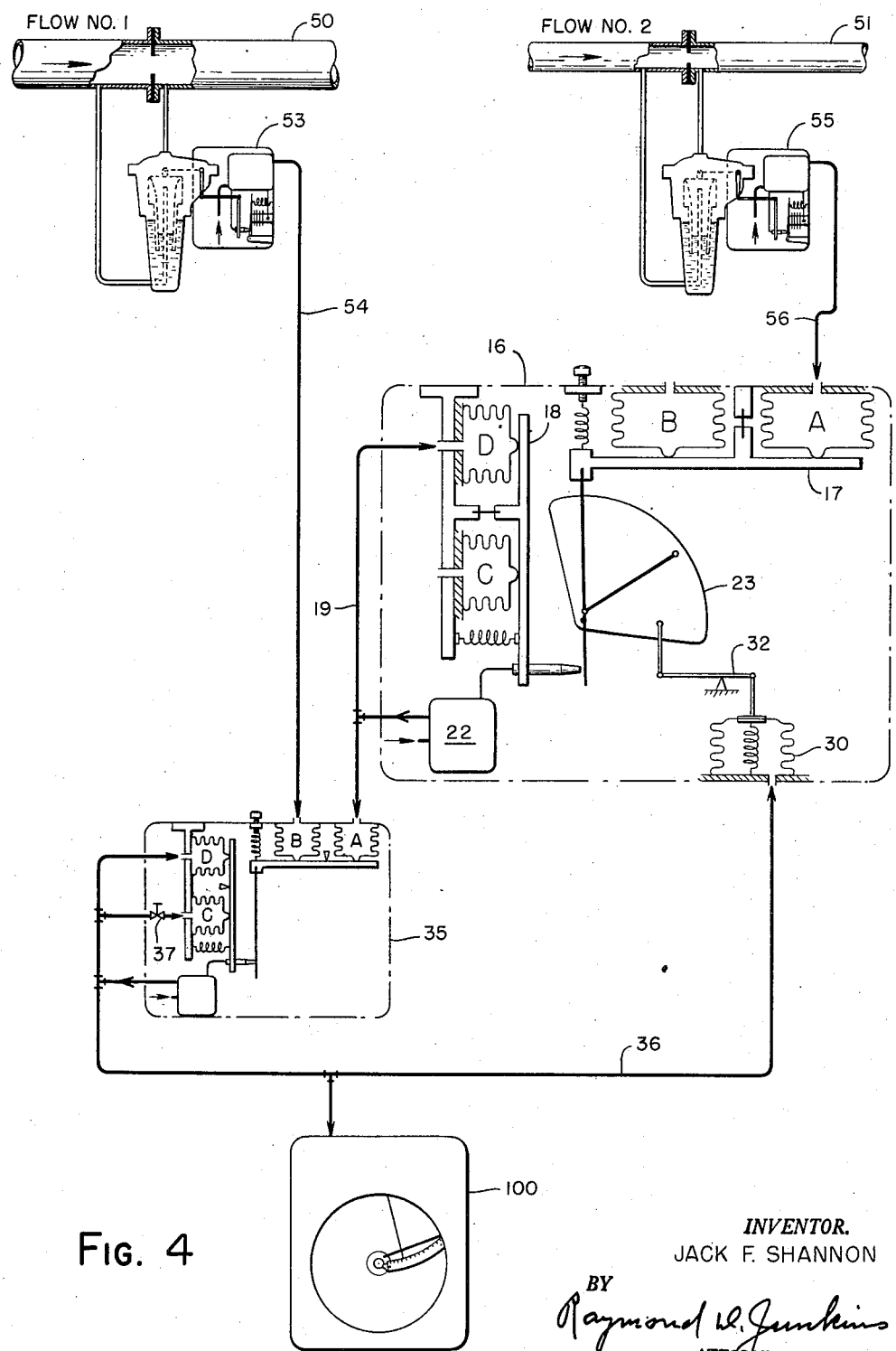
Fig. 4 illustrates a variation of the structure of Fig. 3 in manifesting the ratio of flow conditions as existing in situ.

Referring now to Fig. 4, structure is represented which will manifest the ratio between two condition magnitudes. This manifestation is to be contrasted with the control of ratio by structure illustrated in Figs. 1 and 3. Fig. 1 indicates how to vary ratio over a fixed program, based on the changing values of one of the conditions ratioed, as the dictator. Fig. 3 illustrates how a third variable can form the basis for programming ratio. However, neither of the preceding systems produces an impulse which can be utilized as continuously representative of the ratio itself as it varies in situ.

Fig. 4 actually represents a rearrangement of structure disclosed in Fig. 3. Therefore, Fig. 4 relies directly upon the structural designations of Fig. 3 in illustrating how its particular objective is achieved.

Meters 53 and 55 are duplicated in association with the fluid flows in conduits 50 and 51. Note, however, the absence of a control valve. This emphasizes that the ratio of the magnitudes of fluid flows is to be determined, and manifested, as the flows may come to the system. A number of factors may influence the variation in the flows by means of agencies not illustrated in the disclosure. Whatever the ratio is found to be, between the magnitudes of the fluid flows 1 and 2, the system of Fig. 4 is arranged to manifest it continuously by means of an indicator and scale, or a recording pen on a permanent chart record.

To give the disclosure of Fig. 4 in somewhat more complete form, the casing to which the differential is brought, from an orifice in the fluid flow conduit, is illustrated. The functionally shaped bell, floating upon mercury within the casing, is illustrated as responsive to the differential pressures in actuating the mechanism establishing the fluid pressures representative of the magnitude of the fluid flows. The output fluid pressures of these transmitters are established in pipes 54 and 56, and, due to the functional shapes of the bells, are linearly proportional to the actual flows.

Relays 16 and 35 of Fig. 3 are utilized in their form previously disclosed, however, the pneumatic loading pressures established in pipes 54 and 56 are imposed upon these relays in a manner to attain the particular objective of manifesting the ratio of the fluid flows in conduits 50 and 51.

The functions of relay 16 and relay 35 will be given individually. Appreciation must be had at the outset of the influence each relay has on the function of the other in the system disclosed. Relay 35 may be considered as responsive to the two pneumatic loading pressures of pipes 54 and 56. Enroute to the A and B chambers of relay 35, one of the pressures is multiplied by a factor proportional to the output of relay 35 itself. If this circuit of interaction is understood the individual explanation of each relay will not become confusing.

Consider relay 35 as a balancing device receiving pneumatic loading pressures in its A and B chambers. Unbalance between these pressures in the A and B chambers will cause a movement of the relay baffle relative to its nozzle from the predetermined balanced position of the couple. The couple unbalance changes the output pressure of relay 35, effective in output pipe 36 which takes it back up to relay 16.

Relay 35 gives a reset action disclosed and claimed in Gorrie Re. 21,804. Briefly, the output control pressure of the couple is effective in the C chamber of the relay but at a rate determined by the adjustable restriction 37. This arrangement produces a regenerative action which means that the change in the outgoing control pressure is continued until the input to the relay is returned to its predetermined value. More subjectively described, the equality of the fluid pressures in the A and B chambers maintain relay 35 in balance and the output of relay 35 will proportionately multiply one of the pressures, through relay 16, until the pressures in the A and B chambers are returned to equality.

Now taking up characterizing relay 16, as it is found in position between pipes 56 and 19, it is to be seen as capable of continuously altering the ratio between the pneumatic loading pressures of these pipes. As previously described in Fig. 3, relay 16 is a ratio relay whose proportional band setting determines the ratio between force-beam 17 and force-beam 18. At any fixed position of sector 23, the ratio of the magnitudes of the pneumatic loading pressures in pipes 56 and 19 remains constant. When sector 23 is positioned, by being rotated about its fixed pivot, it varies the linkage with the baffle. Mathematically, this linkage introduces a multiplying factor between the input and the output of the relay 16. As a practical matter, this means that for every position of the sector 23, in its adjustment of linkage with the baffle, a different ratio between the input and output pneumatic pressures of the relay is established.

The pneumatic loading pressure of pipe 36 is introduced into pressure responsive bellows 30 which, through linkage 32, continuously positions sector 23 by rotating it about a pivot. With the understanding that the linkage controlled by sector 23 introduces a multiplying factor between the input and that output of relay 16, and the pneumatic loading pressure of 36 is proportional to this multiplying factor, this pressure in 36, therefore, becomes representative of the ratio of the pressures in pipes 54 and 56 by reason of the multiplying factor being varied until the pressures in the A and B chambers of relay 35 are equalized. The recorder 100 then becomes the relatively simple mechanism responsive to the pneumatic loading pressure of pipe 36 and may be calibrated in terms of the ratio of the conditions.

Referring now to Fig. 5 it can be seen that the structure of Fig. 4 is duplicated below pipes 54 and 56. The same objective is sought. However, although flows 1 and 2, in conduits 50 and 51, are shown as having the ratio of their magnitudes manifested, head meters are indicated as directly responsive to the flows establishing the impulses for pipes 54 and 56.

The orifices in conduits 50 and 51 produce differential pressures which are applied to conventional mercury float U-tube meters, diagrammatically disclosed in actuation of pneumatic transmitters 7 and 8. The outputs of these transmitters 7 and 8 are conducted to relays.

The relays are used as square root extractors with the rate of flow of fluids through conduits 50 and 51 continuously measured by the head meters. The result attained is precisely that as demonstrated in Fig. 4; pneumatic loading pressures, continuously representative of the magnitude of the flows 1 and 2 are established in pipes 54 and 56. The characterizing ability of this improved relay of my parent application is utilized by having the input to the relay adjust the position of the relay sector and thus multiply the input by a factor. Movement of the linkage by the sector in the position shown results in a very nearly linear output for an input equal to the differential, or head, squared.

With the establishment of pneumatic loading pressures in pipes 54 and 56, the remainder of the system operates precisely as disclosed in Fig. 4. The result is a manifestation of the ratio of the flows by recording meter 100.

Up to this point the disclosure has utilized the relay of Gorrie application S. N. 311,098, now Patent 2,776,669. Considering the available adjustment from rotation of sector 23 of the Gorrie relay, it has been pointed out that the limits of this adjustment in terms of proportional band availability varies from about 4% to 300%. Fig. 6 discloses a relay which gives a wider range of this adjustment and which is, therefore, capable of responding to a wider range of ratio values.

Referring now to Fig. 6, specifically, it is to be observed that two pressures are illustrated as the conditions whose magnitudes are to be ratioed. These pressures are conducted to relays which establish pneumatic loading pressures representative of the pressure conditions to which they are sensitive. The two pressures established are then compared in a relay as disclosed in Gorrie Re. 21,804 and the output is caused to modify the output of one of the transmitters in becoming a representative of the ratio of the pressure conditions.

In order to avoid duplication, only the relay transmitter designated 101 will be discussed as embodying all the features of the companion transmitter while additionally being modified to characterize between its input and output as was relay 16 in the preceding disclosure.

Pressure No. 2 is brought to Bourdon 102, as a part of relay transmitter 101. Bourdon tube 102 is linked by a lever system to pilot valve 103 which establishes the pneumatic loading pressure in pipe 104. The linkage had its original disclosure in Gorrie 2,141,464. The commercial form of the device has been somewhat altered to what is disclosed in Fig. 6. Essentially the mechanical advantage the lever system gives the Bourdon tube 102 in moving pilot valve 103 is altered by shifting sector plate 105 to bring pivot points 106 and 107 closer or farther apart. By thus being able to align pivots 106 and 107, the proportional band availability goes to infinity, or zero sensitivity. This is to be compared with the 300% limitation of the relay employed in the preceding disclosure.

The output of pilot valve 103 is conducted to the A chamber of relay 108 while the output of the companion relay transmitter is conducted to the B chamber of 108. Opposing these two pneumatic loading pressures causes relay 108 to act in precisely the manner that relay 35 acted in the preceding Figs. 4 and 5. The output of chamber D of relay 108 is established in pipe 109, making it available for actuation of recorder 100 and for actuation of bellows 110 which positions sector 105. This structural arrangement completes the circuit for causing the output of relay 108 to proportionately establish the multiplying factor applied to the input impulse of relay transmitter 101 in establishment of the pneumatic loading pressure in pipe 104.

Further, not only is recorder 100 sensitive to the fluid loading pressure of pipe 107 for manifestation of the ratio, but, as indicated, this pressure may also be used for control purposes. The control impulse may be utilized to influence one of the conditions ratioed or for some other purpose not disclosed here.

In the preceding disclosure, the systems of arrangements of structure, including the improved relay, have established only unitary impulses. This impulse has been illustrated in control of one condition being compared with another condition. Further, this impulse has been illustrated in representation of a characteristic of a single condition. And further, this impulse has been established as representative of the ratio of the magnitudes of two conditions. It is now proposed to disclose a system, including the improved relay, which will establish a plurality of impulses, employed to control a plurality of agents which separately, and concomitantly, affect a plurality of conditions.

Figure 7:
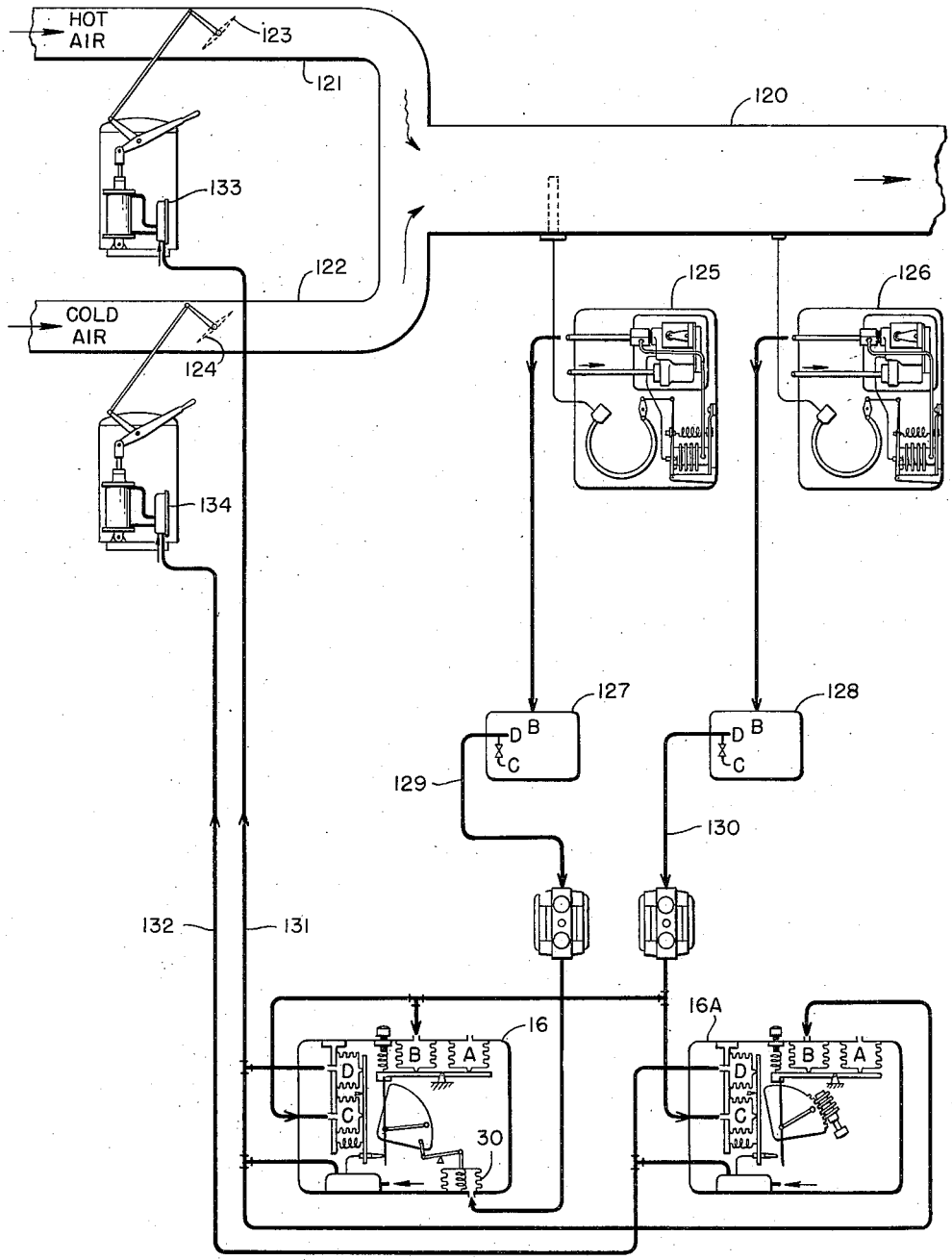
Fig. 7 illustrates control of a plurality of agents going to a plurality of conditions.

Turning, specifically, to the structure of Fig. 7, there has been illustrated a system of duct work including a common duct 120 into which is taken heated air from a duct 121 and cool air from duct 122. The specific control means is illustrated by valve 123 in heated air duct 121 and valve 124 in cooled air duct 122. Manipulations of these valves establish the temperature and pressure in duct 120.

The problem presented is the maintenance of predetermined temperature and pressure in duct 120. Obviously valves 123 and 124 must be moved differentially to arrive at the desired temperature established in duct 120. Additionally, the pressure in duct 120 must be maintained by moving both of the valves in the same direction but with their ratio of opening maintained under direction of the temperature demands.

Conventional temperature and pressure measuring devices 125 and 126 are illustrated as responsive to the temperature and pressure conditions in duct 120. The output of these two transmitters, as fluid pressures, are shown as taken into the standardizing relays 127 and 128 of the previously illustrated form of relay 35. The output of relays 127 and 128, therefore, become fluid pressures in pipes 129 and 130 whose magnitudes are representative of the temperature and pressure demands. Any deviation from the set point established in transmitters 125 and 126 will result in a changing pressure within the preselected range, say 3–27 lbs. per square inch, of the demand output of relays 127 and 128. These established pressures are applied by the structure of my invention, to the control of valves 123 and 124 to maintain the desired pressure and temperature in duct 120.

When the generalized problem is reduced to the practical illustration of maintaining temperature and pressure within a duct by the manipulation of hot air and a cold air supply to that duct, the solution appears relatively simple. However, having available the structure of the improved relay, with its proportional band adjustment pneumatically positionable, and a relay of the same basic type, but with its proportional band manually adjustable, it is actually far from obvious how the required impulses are produced and coordinated. The structure disclosed performs the functions required, including performance when the temperature set point carries its demand pressure to either extreme of its range to keep one of the dampers closed while the other goes through its full travel to maintain the required pressure magnitude in duct 120. Of course, the system is required to operate at any point between these extreme ratio conditions, maintaining the proper proportion between hot and cold air as both move simultaneously to maintain pressure.

With the establishment of a temperature demand fluid pressure impulse in pipe 129 and a pressure demand fluid pressure impulse in pipe 130, each of these fluid pressure impulses going through a range of 3–27 lbs. per square inch, relay 16 and relay 16A are connected in a system to establish fluid pressure outputs in pipes 131 and 132. The characteristics of relay 16 and relay 16A need not be repeated in detail, because of the previous description. It need only be pointed out that the impulse of pipe 130 is imposed upon the B and C chambers of relay 16 and the C chamber of relay 16A. Bellows 30 of relay 16 receives the impulse of pipe 129. The output pressure of relay 16 is established in pipe 131 and is taken to the B chamber of relay 16A and simultaneously moves valve 123 through the agency of positioner 133. The output of the D chamber of relay 16A is taken directly to valve positioner 134 by means of pipe 132.

The calibration of relay 16 arranges for its proportional band to be changed between 100% and 200% as the temperature demand impulse in pipe 129 traverses its 3–27 lb. range. The manually set proportional band of relay 16A is maintained at 50%.

The preceding structural arrangement of the system of my invention provides the desired manipulation of valves 123 and 124 to maintain the set point values of temperature and pressure in duct 120. In analyzing the function of the system, the effect of the extremes of the temperature demand impulse valves is observed as the pressures demand impulse is varied over its range.

Consider first a 3 lb. temperature demand pressure. This value in pipe 129 will maintain the proportional band setting of relay 16 at 100%. Therefore, the pressure demand impulses in the B and C chambers of relay 16 cancel one another, regardless of the value they assume in pipe 130. The output of relay 16 can then be established at 3 lbs. by means of its beam spring. However, the impulse in pipe 130, as a demand for pressure in duct 120, is repeated through relay 16A to operate cold air valve 124.

Now consider the temperature demand impulse at the 27 lb. maximum. The proportional band setting of relay 16 is established at 200%, making relay 16 a halving relay. The pressure demand impulse in pipe 130 is now halved in relay 16. With this halved signal going into the B chamber of relay 16A, to be doubled and subtracted from the signal going into the C chamber, the result is that relay 16A is held at a constant minimum output which may be established at 3 lbs. by spring force on its beams. With the constant 3 lb. output of relay 16A holding cold air valve 124 in its minimum position, the output of relay 16 moves valve 123 through its full range by virtue of positioner 123 being calibrated on a 3–15 lb. range. With this pressure demand impulse simultaneously received in the B and C chambers, and the proportional band setting varied between 100% and 200%, the impulse is, in effect, divided by various values from infinity down to 2. Or, with these connections, the relay 16, is operating with a proportional band from infinity to 200%.

The system is operable at any intermediate temperature demand impulse in pipe 129. Relays 16 and 16A will operate valves 123 and 124 in proportion to the pressure demand value in pipe 130 and at a ratio established by the temperature demand pressure in pipe 129.

While I have illustrated and described certain preferred embodiments of my invention, it will be appreciated that this is by way of example only, and that I am not to be limited thereby.

What I claim as new, and desire to secure by Letters Patent of the United States, is:

1. A system for determining the ratio of the magnitudes of two variables including, separate means for establishing a first and second impulse representative of the magnitudes of first and second conditions, a comparing relay receiving the first impulse directly and which balances impulses received to produce an output impulse representative of the ratio of the condition magnitudes, a characterizing relay receiving the second impulse directly and establishing its output as the input impulse to the comparing relay which is that impulse balanced with the first impulse, linkage structure within the characterizing relay for adjusting the ratio of the magnitudes of the input and output impulses of the relay, means by which an impulse positions the linkage structure within the characterizing relay, a conduit for subjecting the means for positioning the linkage structure to the output impulse of the comparing relay, and manifesting means responsive to the output impulse of the comparing relay in order to indicate and/or record the ratio of the magnitudes of the conditions.

2. A system or combination of apparatus for producing a fluid pressure representative of the ratio of two variables including, separate means for producing fluid pressures representative of a first and second variable, a first fluid pressure relay having a force-balance beam, fluid pressure receiving chambers acting in opposition on the force-balance beam, means in the first relay producing an output fluid pressure continuously representative of the pressures in the first and second fluid pressure receiving chambers, means by which the first fluid pressure acts directly on one of the fluid pressure receiving chambers, a second relay structure receiving the second of the fluid pressures directly and producing an output fluid pressure proportional to the second fluid pressure, means for imposing the output of the second fluid pressure relay directly on a second of the fluid pressure receiving chambers of the first relay, means in the second relay adapted to vary the ratio between the second fluid pressure and the output of the second relay, conduit means for imposing the output fluid pressure of the first relay upon the means adjusting the ratio of the second relay, and means for manifesting the output fluid pressure of the first relay as a ratio of the two variables.

3. A ratio measuring system, including; a first fluid pressure relay including, two pressure responsive chambers having movable walls arranged to differentially act upon a beam pivoted intermediate its ends, and a fluid pressure couple actuated by the beam to produce an output; a second fluid pressure relay including, a fluid pressure couple whose output is placed in a first of the pressure responsive chambers of the first relay, a first pressure responsive chamber having a movable wall whose force is applied to the couple of the second relay, a lever structure between the first chamber and the second couple and arranged to adjust the ratio between the magnitudes of the chamber force and the couple output, and a second pressure responsive chamber receiving the output of the first relay couple and positioning the lever structure to balance the forces of the two pressure responsive chambers of the first relay; and an exhibiting means responsive to the output of the first fluid pressure couple.

4. A system of, or combination of, apparatus for producing a fluid pressure representative of the ratio of two variables, including; a first fluid pressure relay for characterizing a fluid pressure including, a fluid pressure couple in the first relay establishing an output, a beam system actuating the couple, a first fluid pressure responsive chamber acting on the beam system, a biasing structure arranged to position the beam system to vary the ratio between the first chamber force and the couple output, and a second fluid pressure responsive chamber for actuating the biasing structure; transmitters of fluid pressures associated with separate conditions whose magnitudes are to be compared as a ratio; means for placing the output of one transmitter directly in the fluid pressure responsive chamber of the first relay; a second fluid pressure relay for comparing fluid pressures and establishing a fluid pressure output when the compared pressures are imposed on the relay; means for placing the output of the other transmitter and fluid pressure couple of the first relay in comparative relation within the second relay; means for placing the output of the second relay directly in the second pressure responsive means of the first relay to actuate the biasing structure in equalizing the inputs compared in the second relay; and manifesting means responsive to the output fluid pressure of the second relay as representative of the ratio of the variables.

5. A system for determining the ratio of the magnitudes of two variables including, a first transmitter establishing a first force continuously representative of the magnitude of a first variable condition, a second transmitter establishing a second force continuously representative of the magnitude of a second variable condition, a reset relay receiving the first force directly, a ratio relay receiving the second force directly, a fluid pressure couple in the ratio relay establishing an output pressure and responsive to the second force and concomitantly to the said output pressure fed back to the ratio relay, a linkage system between the couple and the second force which is movable to various positions to provide a variable multiplying factor between the values of the second force and the output pressure, means in the reset relay for receiving the output pressure of the fluid pressure couple of the ratio relay and comparing it with the first force, a fluid pressure couple in the reset relay responsive to the comparing means and establishing the output pressure which the reset structure of the relay causes to continuously increase as long as a difference exists between the ratio relay output pressure and the first force, a pressure responsive chamber in the ratio relay receiving the output of the fluid pressure of the reset relay and giving the linkage system of the ratio relay a movement proportional to the reset relay output, and a manifesting means responsive to the reset relay output in terms of ratio of the magnitudes of the first and second variables.

6. The system of claim 5 in which the linkage system through which the second force is exerted includes a sector carrying the pivot points of the linkage to change the mechanical advantage between the second force and the couple, and the sector is rotated about a pivot point to shift the pivot points of the linkage in changing the mechanical advantage determining the value of the multiplying factor between the second force and the couple output of the ratio relay.

7. A system for controlling two agents which maintain the magnitudes of two conditions of a single medium, including; means for establishing a first and second impulse representative of demand for each condition of the medium; a first multi-chambered relay of the force-position-balance type including, expansible chambers with movable walls, a beam system on which the chambers exert their forces, a fluid pressure couple actuated by the beam system, two of the chambers arranged to receive the first impulse simultaneously, and a linkage system pneumatically adjusted from the second impulse which proportions the effect of said two chambers upon the fluid pressure couple output; a second multi-chambered relay of the force-position-balance type including, expansible chambers with movable walls, a beam system on which the chambers exert their forces, a fluid pressure couple actuated by the beam system, one chamber arranged to receive the output of the first relay and another chamber to receive the second impulse, and means provided to proportion the effect of the first relay output and second impulse on the fluid pressure couple output at 2 to 1 and in opposite directions; and regulators for each of the two agents responsive to the relay outputs.

8. The system of claim 7 in which the proportionate effects on the output by the chambers of the first relay receiving the first impulse simultaneously is varied between the ratios of 1 to 1 and 1 to 2.

9. The system of claim 8 in which the regulator responsive to the first relay has full travel response range substantially half of that range of the regulator responsive to the second relay.

References Cited in the file of this patent

UNITED STATES PATENTS

| | | |
|---|---|---|
| 2,257,905 | Gorrie | Oct. 7, 1941 |
| 2,550,666 | Bilyeu | May 1, 1951 |